United States Patent
Schneider et al.

(10) Patent No.: US 9,334,893 B2
(45) Date of Patent: *May 10, 2016

(54) BLIND RIVET AND FASTENING ARRANGEMENT WITH A BLIND RIVET

(75) Inventors: Stephan Schneider, Giessen (DE); Bernd Jonuscheit, Jembke (DE)

(73) Assignee: NEWFREY LLC, New Britain, CT (US)

(*) Notice: Subject to any disclaimer, the term of this patent is extended or adjusted under 35 U.S.C. 154(b) by 422 days.

This patent is subject to a terminal disclaimer.

(21) Appl. No.: 13/702,721

(22) PCT Filed: May 17, 2011

(86) PCT No.: PCT/EP2011/057927
§ 371 (c)(1),
(2), (4) Date: Feb. 18, 2013

(87) PCT Pub. No.: WO2011/154224
PCT Pub. Date: Dec. 15, 2011

(65) Prior Publication Data
US 2013/0177365 A1    Jul. 11, 2013

(30) Foreign Application Priority Data
Jun. 8, 2010 (DE) .................... 10 2010 017 296

(51) Int. Cl.
*F16B 13/04* (2006.01)
*F16B 19/10* (2006.01)

(52) U.S. Cl.
CPC .................. *F16B 19/1054* (2013.01)

(58) Field of Classification Search
CPC ............. F16B 19/1054; F16B 13/06
USPC ................ 411/34, 37, 40–43, 45, 501
See application file for complete search history.

(56) References Cited

U.S. PATENT DOCUMENTS

| | | |
|---|---|---|
| 1,979,686 A | 11/1934 | Hall et al. |
| 1,996,128 A | 4/1935 | Morris |
| 2,146,461 A | 2/1939 | Bettington |
| 2,183,543 A | 12/1939 | Cherry |
| 2,328,023 A | 8/1943 | Lang |
| 2,366,965 A | 1/1945 | Johnson |
| 2,371,423 A | 3/1945 | Buchet |
| 2,371,452 A | 3/1945 | Lees, Jr. |
| 2,384,321 A | 9/1945 | Lees, Jr. |

(Continued)

FOREIGN PATENT DOCUMENTS

| | | |
|---|---|---|
| DE | 3612501 A1 | 10/1987 |
| DE | H03-48106 U | 5/1991 |

(Continued)

OTHER PUBLICATIONS

Notification of Reason for Rejection dated Nov. 25, 2014 in corresponding Japanese Patent Application No. 2013-513601, with English translation.

(Continued)

*Primary Examiner* — Gary Estremsky
(74) *Attorney, Agent, or Firm* — Harness, Dickey & Pierce, P.L.C.

(57) ABSTRACT

A blind rivet for joining components made of plastic has a hollow rivet body with an elongated shank and a flange and, located in the bore of the rivet body, a mandrel with a mandrel shank, a drawing end, and a mandrel head. The shank of the rivet body has a first section adjoining the flange and a second section adjacent thereto. The second section is designed to form a flange that lies flat against the component located on the inaccessible side. The strength of the first section is increased with respect to the strength of the second section in such a manner that the outside diameter of the first section does not increase or increases only slightly during setting of the blind rivet.

31 Claims, 2 Drawing Sheets

(56) References Cited

U.S. PATENT DOCUMENTS

| | | |
|---|---|---|
| 2,546,602 A | 3/1951 | Keating |
| 2,774,098 A | 12/1956 | Tieri |
| 2,885,798 A | 5/1959 | Wilson |
| 3,047,181 A | 7/1962 | Heidenwolf |
| 3,055,255 A | 9/1962 | Burrell |
| 3,144,158 A | 8/1964 | Nouvelet |
| 3,148,578 A | 9/1964 | Gapp |
| 3,149,530 A | 9/1964 | Kolec |
| 3,253,495 A | 5/1966 | Orloff |
| 3,390,601 A | 7/1968 | Summerlin |
| 3,424,051 A | 1/1969 | Baugh |
| 3,426,375 A | 2/1969 | Jeal |
| 3,438,301 A | 4/1969 | Mattioli |
| 3,459,447 A | 8/1969 | Hurd et al. |
| 3,460,429 A | 8/1969 | La Torre |
| 3,491,649 A | 1/1970 | Smouton et al. |
| 3,515,419 A | 6/1970 | Baugh |
| 3,726,553 A | 4/1973 | Reynolds et al. |
| 3,750,518 A | 8/1973 | Rayburn |
| 3,835,688 A | 9/1974 | King, Jr. |
| 3,837,208 A | 9/1974 | Davis et al. |
| 3,875,649 A | 4/1975 | King, Jr. |
| 3,915,055 A | 10/1975 | Binns |
| 3,922,586 A | 11/1975 | Buxton et al. |
| 3,949,535 A | 4/1976 | King, Jr. |
| 3,975,786 A | 8/1976 | Gapp et al. |
| 4,003,288 A | 1/1977 | Jeal |
| 4,044,591 A | 8/1977 | Powderley et al. |
| 4,137,817 A | 2/1979 | Siebol |
| 4,164,807 A | 8/1979 | King, Jr. |
| 4,236,429 A | 12/1980 | Dolch |
| 4,261,245 A | 4/1981 | Mauer |
| 4,388,031 A | 6/1983 | Rodgers |
| 4,405,273 A | 9/1983 | Ruhl et al. |
| 4,407,619 A | 10/1983 | Siebol |
| 4,447,944 A | 5/1984 | Mohrman |
| 4,466,048 A | 8/1984 | Schwab |
| 4,473,914 A | 10/1984 | Haft |
| 4,497,603 A | 2/1985 | Boucher et al. |
| 4,507,706 A | 3/1985 | Trexler, Jr. |
| 4,541,032 A | 9/1985 | Schwab |
| 4,541,761 A | 9/1985 | Bryce, Jr. |
| 4,585,382 A | 4/1986 | Bryce, Jr. |
| 4,585,383 A | 4/1986 | Kraemer |
| 4,620,825 A | 11/1986 | Potzas |
| 4,639,174 A | 1/1987 | Denham et al. |
| 4,639,175 A | 1/1987 | Wollar |
| 4,659,271 A | 4/1987 | Pratt et al. |
| 4,702,655 A | 10/1987 | Kendall |
| 4,736,560 A | 4/1988 | Murphy |
| 4,765,010 A | 8/1988 | Jeal et al. |
| 4,781,501 A | 11/1988 | Jeal et al. |
| 4,836,728 A | 6/1989 | Mauer et al. |
| 4,858,067 A | 8/1989 | Rochelle et al. |
| 4,863,325 A | 9/1989 | Smith |
| 4,877,362 A | 10/1989 | Berecz et al. |
| 4,893,390 A | 1/1990 | Hoeffken |
| 4,897,003 A | 1/1990 | Bradley et al. |
| 4,904,133 A | 2/1990 | Wright |
| 4,909,687 A | 3/1990 | Bradley et al. |
| 4,929,137 A | 5/1990 | Bossenmaier |
| 4,958,971 A | 9/1990 | Lacey et al. |
| 4,969,785 A | 11/1990 | Wright |
| 5,006,024 A | 4/1991 | Siebol |
| 5,030,050 A * | 7/1991 | Auriol et al. ............... 411/38 |
| 5,035,129 A | 7/1991 | Denham et al. |
| 5,044,850 A | 9/1991 | Getten et al. |
| 5,054,977 A | 10/1991 | Schultz |
| 5,167,585 A | 12/1992 | Williams et al. |
| 5,252,013 A | 10/1993 | Browne et al. |
| 5,259,713 A | 11/1993 | Renner et al. |
| 5,299,667 A | 4/1994 | Hammond |
| 5,320,465 A | 6/1994 | Smith |
| 5,326,205 A * | 7/1994 | Anspach et al. ............ 411/43 |
| 5,333,980 A | 8/1994 | Pratt et al. |
| 5,359,765 A | 11/1994 | Auriol et al. |
| 5,378,098 A | 1/1995 | Andrews et al. |
| 5,403,135 A | 4/1995 | Renner et al. |
| 5,443,344 A | 8/1995 | Underwood, Jr. |
| 5,476,350 A | 12/1995 | Kurtz et al. |
| 5,496,140 A | 3/1996 | Gossmann et al. |
| 5,503,510 A | 4/1996 | Golan et al. |
| 5,551,817 A | 9/1996 | Kanie et al. |
| 5,569,006 A | 10/1996 | Alvarado et al. |
| 5,645,383 A | 7/1997 | Williams et al. |
| 5,651,172 A | 7/1997 | Auriol et al. |
| 5,658,107 A | 8/1997 | Smith et al. |
| 5,689,873 A | 11/1997 | Luhm |
| 5,741,099 A | 4/1998 | Aasgaard |
| 5,743,691 A | 4/1998 | Donovan |
| 5,759,001 A | 6/1998 | Smith et al. |
| 5,881,989 A | 3/1999 | O'Brien et al. |
| 5,889,648 A | 3/1999 | Heavirland et al. |
| 5,890,693 A | 4/1999 | Do et al. |
| 5,915,901 A | 6/1999 | Aasgaard |
| 5,960,667 A | 10/1999 | Hylwa et al. |
| 5,982,610 A | 11/1999 | Crawford et al. |
| 6,004,086 A | 12/1999 | Gand et al. |
| 6,007,287 A | 12/1999 | Toosky et al. |
| 6,042,313 A | 3/2000 | Dehlke |
| 6,081,984 A | 7/2000 | Sherry |
| 6,171,038 B1 | 1/2001 | Pratt et al. |
| 6,224,310 B1 | 5/2001 | Summerlin et al. |
| 6,254,324 B1 * | 7/2001 | Smith et al. ............... 411/34 |
| 6,276,050 B1 | 8/2001 | Mauer et al. |
| 6,299,398 B1 | 10/2001 | Shinjo et al. |
| 6,389,676 B1 | 5/2002 | Denham |
| 6,398,472 B1 | 6/2002 | Jones et al. |
| 6,418,599 B2 | 7/2002 | Suzuki et al. |
| 6,428,255 B1 | 8/2002 | Smith et al. |
| 6,443,322 B1 | 9/2002 | Braun et al. |
| 6,445,568 B1 | 9/2002 | Baur et al. |
| 6,461,213 B1 | 10/2002 | Volz |
| 6,484,370 B2 | 11/2002 | Kanie et al. |
| 6,502,008 B2 | 12/2002 | Maurer et al. |
| 6,553,622 B2 | 4/2003 | Maruyama et al. |
| 6,637,995 B1 | 10/2003 | White |
| 6,729,820 B2 | 5/2004 | Kuo |
| 6,746,192 B2 * | 6/2004 | Eshraghi ............... 411/37 |
| 6,751,841 B2 | 6/2004 | Schnabel et al. |
| 6,754,066 B2 | 6/2004 | Doan et al. |
| RE38,664 E | 11/2004 | Luhm |
| 6,826,820 B2 | 12/2004 | Denham et al. |
| 6,854,940 B2 | 2/2005 | Jennings et al. |
| 6,877,204 B1 | 4/2005 | Schnabel et al. |
| 6,881,898 B2 | 4/2005 | Baker et al. |
| 6,898,918 B2 | 5/2005 | Eshraghi |
| 6,905,296 B2 | 6/2005 | Millington et al. |
| RE39,582 E | 4/2007 | Luhm |
| 7,650,681 B2 | 1/2010 | Jones et al. |
| 7,937,821 B2 | 5/2011 | Jones et al. |
| 8,096,742 B2 | 1/2012 | Davies et al. |
| 8,696,276 B2 * | 4/2014 | Schneider et al. ............... 411/43 |
| 2001/0005475 A1 | 6/2001 | Frigg |
| 2002/0085895 A1 | 7/2002 | Dehlke |
| 2003/0082025 A1 | 5/2003 | Luhm |
| 2003/0123949 A1 | 7/2003 | Eshraghi |
| 2004/0022597 A1 | 2/2004 | Jones et al. |
| 2004/0071522 A1 | 4/2004 | Millington |
| 2004/0071525 A1 | 4/2004 | Millington |
| 2004/0247414 A1 | 12/2004 | Pearce et al. |
| 2005/0100423 A1 | 5/2005 | Summerlin |
| 2005/0214094 A1 | 9/2005 | Summerlin |
| 2006/0251490 A1 | 11/2006 | Kleinman et al. |
| 2007/0147971 A1 | 6/2007 | Jennings et al. |
| 2007/0154277 A1 | 7/2007 | Smith et al. |
| 2009/0031549 A1 | 2/2009 | Jones et al. |

FOREIGN PATENT DOCUMENTS

| | | |
|---|---|---|
| DE | 4003136 | 8/1991 |
| EP | 0251700 A2 | 1/1988 |
| EP | 0635647 A1 | 1/1995 |
| EP | 0841491 A1 | 5/1998 |

(56) References Cited

FOREIGN PATENT DOCUMENTS

| | | | |
|---|---|---|---|
| EP | 1030069 A2 | 8/2000 | |
| EP | 1217229 A2 | 6/2002 | |
| FR | 724509 A | 4/1932 | |
| FR | 1494693 | 9/1967 | |
| FR | 1553116 | 1/1969 | |
| GB | 642664 | 9/1950 | |
| GB | 1046239 A | 10/1966 | |
| GB | 1066033 | 4/1967 | |
| GB | 1178655 A | 1/1970 | |
| GB | 1183049 | 3/1970 | |
| GB | 1413592 A | 11/1975 | |
| GB | 1495592 | 12/1977 | |
| GB | 1572269 | 7/1980 | |
| GB | 2288649 A | 10/1995 | |
| GB | 2353834 A | 3/2001 | |
| GB | 2371344 A | 7/2002 | |
| GB | 2 457 105 | * 8/2009 | ............. F16B 19/10 |
| JP | 3048106 A | 3/1991 | |
| JP | 05335756 A | 12/1993 | |
| JP | 8-086304 A | 4/1996 | |
| JP | 11-013723 A | 1/1999 | |
| JP | 11284357 A | 10/1999 | |
| JP | 20000266019 | 9/2000 | |
| JP | 2000277947 A | 10/2000 | |
| JP | 2008-208899 A | 9/2008 | |
| NL | 99009 C | 8/1961 | |
| WO | WO-9525469 A1 | 9/1995 | |
| WO | WO-98/23872 A1 | 6/1998 | |
| WO | WO-2006008268 A1 | 1/2006 | |
| WO | WO-2006/128652 A1 | 12/2006 | |
| WO | WO-2009098431 A1 | 8/2009 | |
| WO | WO-2011154224 A1 | 12/2011 | |

OTHER PUBLICATIONS

The Second Office Action dated Dec. 25, 2014 in corresponding Chinese Patent Application No. 201180027864.7, with English translation.

"Assembly Directory & Handbook", Hitchcock Publishing Company, vol. 5, 1966, pp. 218-249.

"Design Considerations for Blind Fasteners," 'OEM Design', Jul. 1992 (2 pages).

2 drawings of Briv blind rivet (published by another prior to Aug. 2007), 1 page.

Avdel, Animation of Avdel—Speed Fastening Systems: Briv series (published before Aug. 2007), 5 pages.

BRIV.RTM. Fastening Systems—Product Information brochure published Jan. 1997 (4 pages).

Brochure entitled "Cherry Commercial Products—Cherry C. Rivets", (published prior to 2002), 6 pages.

CHOBERT.RTM. Fastening Systems—Product Information brochure published Jan. 1997 (4 pages).

Mark P. Spector, "AE Blind Riveting of Plastics," 'Design/Fastening/Joining', believed to have been published before 2002 (4 pages).

Paul A. Gustafson et al. "For Special Applications: Special Blind Rivets", 'AE Design/Fastening/Joining', Aug. 1979 (3 pages).

Photograph of Emhart blind rivet Part No. 14021 (believed to have been publicly used prior to May 2002).

Photograph of Emhart blind rivet Part No. 14045 (believed to have been publicly used prior to May 2002).

Photograph of Emhart blind rivet Part No. 14046M (believed to have been publicly used prior to May 2002).

Photograph of Emhart blind rivet Part No. 14171 (believed to have been publicly used prior to May 2002).

Photograph of Emhart blind rivet Part No. 15780 (believed to have been publicly used prior to May 2002).

Photograph of Emhart blind rivet Part No. 15780M (believed to have been publicly used prior to May 2002).

Photograph of Emhart blind rivet Part No. 15891 (believed to have been publicly used prior to May 2002).

Photograph of Emhart blind rivet Part No. 16220M (believed to have been publicly used prior to May 2002).

Photograph of Emhart blind rivet Part No. 16225 (believed to have been publicly used prior to May 2002).

Photograph of Emhart blind rivet Part No. 16226 (believed to have been publicly used prior to May 2002).

Photograph of Emhart blind rivet Part No. 16289 (believed to have been publicly used prior to May 2002).

* cited by examiner

BLIND RIVET AND FASTENING ARRANGEMENT WITH A BLIND RIVET

CROSS-REFERENCE TO RELATED APPLICATIONS

This application is a National Phase Entry of International Application No. PCT/EP2011/057927, filed on May 17, 2011, which claims priority to German Patent Application Serial No. 10 2010 017 296.9, filed on Jun. 8, 2010, both of which are incorporated by reference herein.

BACKGROUND AND SUMMARY

The invention concerns a blind rivet, in particular for joining components made of plastic, having a hollow rivet body that has an elongated shank that extends coaxially to a longitudinal center axis of the blind rivet and has a bore, having a flange extending radially at one end of the shank for contact with an accessible side of a component, and having, at the opposite end of the shank, a foot end that is passed through openings in the components, and having, located in the bore of the rivet body, a mandrel that has a mandrel shank, a drawing end projecting out of the flange of the rivet body that can be separated from the mandrel shank, and a mandrel head that stands in operative connection with the foot end of the rivet body in order to transmit a force to the rivet body during setting of the blind rivet. The invention additionally concerns a fastening arrangement with such a blind rivet.

A blind rivet of the specified type is known from WO 2009/098,431 A1. Such blind rivets are used to permanently join workpieces that are in contact with one another. The workpieces typically have bores or holes passing through them that are brought into alignment with one another and into which the blind rivet is placed and then fastened by deformation. A fastened blind rivet usually results in a clearance-free seating of the rivet body in the holes of the workpieces and clamps the workpieces together.

In the automotive industry, uses of blind rivets include fastening attached parts such as power-window motors, loudspeakers, and other parts, to a component support, such as a door module support, using one or more blind rivets. In many cases, the mounting portions of the attached parts and component supports are made of plastic, with the result that the fastening with blind rivets was only satisfactory with the use of additional components made of metal to reinforce the plastic parts. Without metal reinforcing parts, setting of the rivet joints can occur that could lead to a detachment of the joint under load. The settings are caused by the customary formation of the blind head during setting of the blind rivet. Furthermore, under certain circumstances the mounting hole in the plastic component may split due to the radial expansion of the rivet shank during setting of the rivet.

The object of the invention is to create a blind rivet of the initially mentioned type and a fastening arrangement with such a blind rivet that permit improved joining of components made of plastic. According to the invention, the blind rivet comprises a hollow rivet body that has an elongated shank that extends coaxially to a longitudinal center axis of the blind rivet and has a bore, a flange extending radially at one end of the shank for contact with an accessible side of a component, and, at the opposite end of the shank, a foot end that is passed through openings in the components, and additionally has, located in the bore of the rivet body, a mandrel that has a mandrel shank, a drawing end that projects out of the flange of the rivet body and can be separated from the mandrel shank, and a mandrel head that stands in operative connection with the foot end of the rivet body in order to transmit a force to the rivet body during setting of the blind rivet, wherein the shank of the rivet body has a first section adjoining the flange and, adjacent thereto and extending to the foot end, a second section, and the second section is designed such that, as a result of a process in which the flange is pressed against one side of the components and the foot end is simultaneously drawn toward the other side of the components with the aid of the mandrel, a flange forms that lies flat against the component located on the inaccessible side, and wherein the strength of the first section of the shank is increased with respect to the strength of the second section in such a manner that the outside diameter of the first section does not increase or increases only slightly as a result of the process.

The blind rivet according to the invention is distinguished from prior art blind rivets in that the first section of the shank of the rivet body adjoining the flange is hardened in such a manner that it is not expanded or is expanded only slightly during setting of the blind rivet. Consequently, the hardened section of the blind rivet can be placed in a component hole with a slight oversize without having an increased radial pressure arise between the rivet section and the wall of the bore during setting, which could cause damage to the component. The blind rivet according to the invention is thus suitable for fastening components made of lower strength materials such as plastic, with it being possible to dispense with additional metal reinforcing parts, such as washers or tubular rivets. The elimination of additional reinforcing parts made of metal also results in cost advantages during assembly, and expands the range of application possibilities for the blind rivet according to the invention.

According to another proposal of the invention, the increase in strength of the first section of the rivet body is accomplished through plastic deformation. The plastic deformation can be accomplished in that the first section has multiple radial indentations, compressions, or crimps, which extend over a substantial part of its length. As a result of the plastic deformation, the first section may also be provided with multiple longitudinal ribs. The plastic deformation produces work hardening in the region of the first section, causing the deformation resistance of the first section to be significantly increased as compared to the second section. The first section can thus better withstand the forces occurring during deformation of the second section of the rivet body, so that no radial deformation, or at most minor radial deformation, of the first section occurs during setting of the blind rivet. Additionally, the strengthening of the first section by plastic deformation has the advantage that the diameter of the first section can correspond essentially to the diameter of the second section, and the rivet body is easy to manufacture. The foot end of the rivet body also can have an increased strength brought about by plastic deformation so that it can better withstand compressive forces acting during the setting process.

According to another proposal of the invention, provision can be made for the mandrel shank to have at least one constriction and/or projection in the region of the foot end and for the foot end to be brought by plastic deformation into a shape that engages in the constriction and/or engages around the projection. By this means, the rivet body is joined to the rivet mandrel in an interlocking manner so that the two parts form an easy-to-manage structural unit. During setting of the blind rivet, the mandrel shank with the attached mandrel head is held securely by the rivet body as a result of this interlocking connection. By this means, disadvantages resulting from a released mandrel head and mandrel shank are avoided. The constriction and/or projection can be designed in an annular form and can accomplish an improved sealing of the mandrel shank with respect to the rivet body in conjunction with the plastically deformed foot end.

According to the invention, the mandrel shank and the drawing end are joined by a constricted parting section, which is arranged in the bore of the rivet body such that the end of the mandrel shank adjacent to the parting section is recessed within the bore of the rivet body. The danger of injury by the sometimes sharp-edged broken end of the mandrel shank is avoided by this means. A fastening arrangement with at least two components that are joined together by the setting of a blind rivet according to the invention comprises an accessible first component and a second component located inaccessibly behind the first component, wherein the two components have bores that are aligned with one another through which the blind rivet passes, wherein the flange of the blind rivet rests against the first component, the first section of the rivet's shank extends through the first component, and the second section of the shank forms a flange that lies flat against the back of the second component, and wherein the outside diameter of the first section of the shank is equal to or smaller than the original inside diameter of the bore in the first component.

In the fastening arrangement according to the invention, the two components are clamped together between the flange and the second section that has been formed into a flange. However, the expansion of the first section of the blind rivet is reduced enough that its outside diameter essentially does not increase beyond the inside diameter of the bore in the first component. Overstressing of the component through expansion of the blind rivet during setting is avoided, so that splitting of the component also cannot occur. Consequently, the first component can be made of plastic and does not require any reinforcements made of metal.

If both components are made of plastic, it is advantageous for the length of the first section of the shank to be essentially equal to the sum of the thicknesses of the first and second components in the region of the bores that the blind rivet passes through, or to be smaller than the said sum. The reduction in the expansion of the blind rivet is then effective for the second component as well. For tight sealing of the fastening arrangement, according to the invention the mandrel shank is enclosed in an interlocking manner by the foot end of the rivet body, by which means it forms a seal together with the mandrel head for the blind-side end of the bore of the rivet body.

BRIEF DESCRIPTION OF THE DRAWINGS

The invention is explained in detail below with reference to exemplary embodiments that are shown in the drawings. They show.

DETAILED DESCRIPTION

Figure 1:
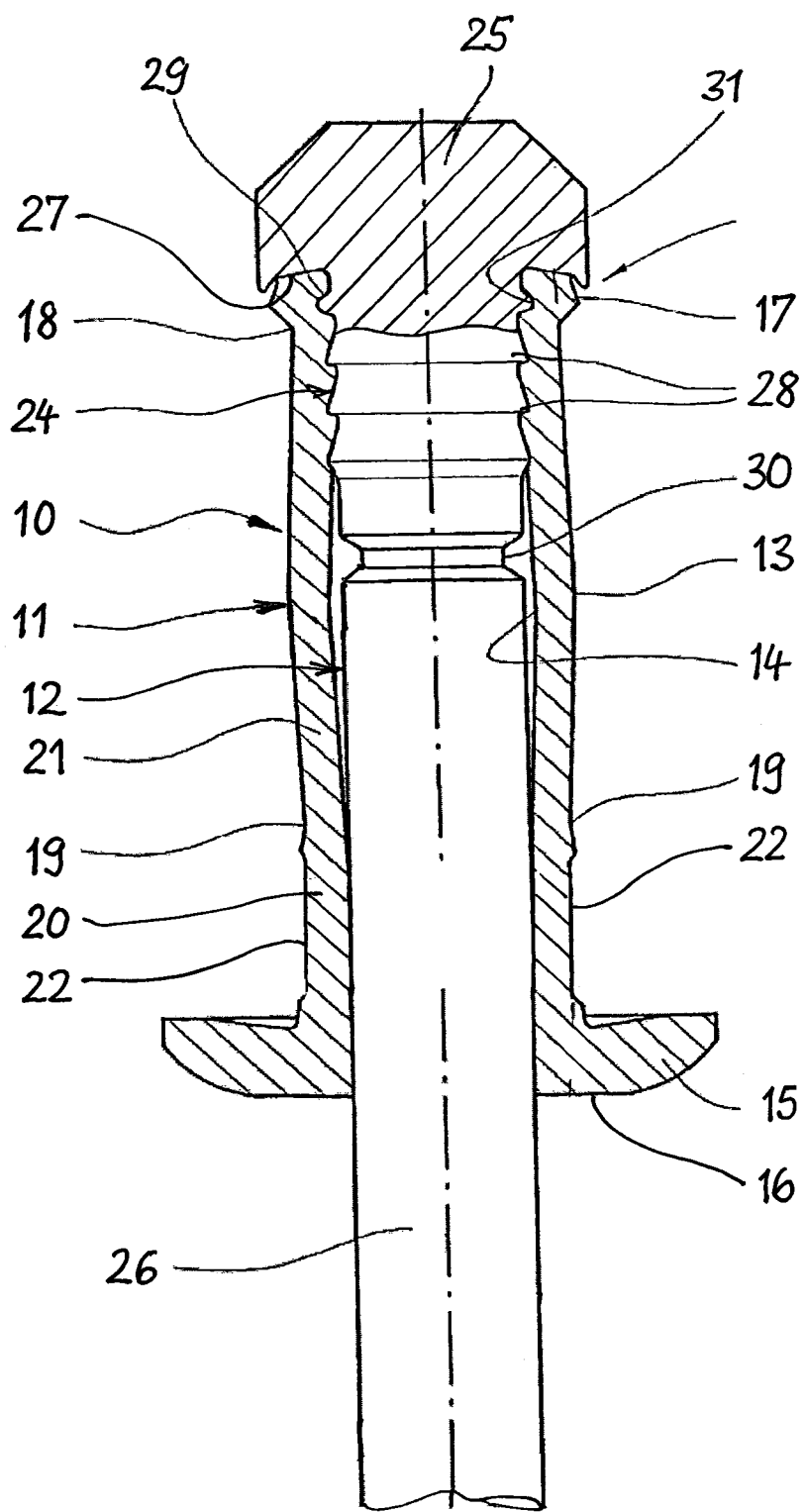
FIG. 1, a cross-section of a blind rivet according to the invention.

FIG. 1 shows a blind rivet 10, which is composed of a rivet body 11 made of aluminum and a mandrel 12 made of steel. The rivet body 11 is attached to the mandrel 12 and has an elongated shank 13 with a through-bore 14, in which the mandrel is located. Formed at a head end of the shank 13 is a flange 15, which takes the form of an annular disk and is intended to contact a workpiece. The side of the flange 15 facing away from the shank 13 is provided with a flat support surface 16, whose purpose is supporting the forward end of a rivet setting tool.

At its end opposite the flange 15, the shank 13 forms a foot end 17, which is offset from the shank 13 by means of a first constriction 18. A second constriction 19 divides the shank 13 into an essentially cylindrical first section 20, and a barrel-like second section 21 that curves slightly outward. On its outside, the first section 20 is provided with multiple flat indentations 22 spaced at regular intervals from one another; these extend in the axial direction over almost the entire length of the first section 20. As a result of the indentations 22 produced by way of cold forming, the strength of the shank 13 in the region of the first section 20 is increased with the result that the first section 20 is no longer expanded or is only slightly expanded during setting of the blind rivet 10. In the region of the first section 20 and in the region of the foot end 17, the rivet body 11 is in contact with the mandrel 12; in the central region that curves outward, an annular clearance is present between the rivet body 11 and the mandrel 12.

The mandrel 12 has a mandrel shank 24 that bears a mandrel head 25 at one end, and an elongated drawing end 26 at the other end. The mandrel head 25 has a greater diameter than the mandrel shank 24, and has, on the underside facing the mandrel shank 24, flat contact surfaces 27 for the foot end 17 of the shank 13. The contact surfaces 27 are inclined at an acute angle of approximately 70° to 80° with respect to the longitudinal axis of the mandrel 12. In place of the flat contact surfaces 27, a concave conical surface with corresponding inclination may also be provided. The end of the mandrel head 25 opposite the contact surfaces 27 is in the shape of a truncated cone in order to facilitate insertion of the blind rivet 10 in the workpiece bores.

On part of its length, the mandrel shank 24 has locking means in the form of annular ribs 28, which are spaced apart from one another and have a sawtooth-like cross-section that is composed of conical surfaces and radial surfaces. The conical surfaces of the ribs 28 face the mandrel head 25. Located between the mandrel head 25 and the rib 28 adjacent thereto is a rib 29, which is embedded in a groove 31 in the foot end 17 and holds the mandrel 12 in place in the rivet body 11 against the recoil that attempts to drive the mandrel 12 out of the rivet body 11 when the drawing end 26 pulls off during setting of the blind rivet. The rib 29 also ensures an effective seal between the rivet body 11 and the mandrel 12 after the blind rivet has been set. The bore 14 is adapted to the outside contour of the ribs 28, 29 by radial deformation of the rivet body, forming an interlocking connection between the mandrel shank 25 and the shank 13, which contributes to the transmission of tensile forces to the rivet body during setting of the blind rivet. Moreover, the mandrel 12 is held fast in the bore 14 of the shank 13, so that the rivet body 11 and the mandrel 12 compose an easy-to-manipulate unit.

The drawing end 26 is connected to the mandrel shank 24 by means of a constricted parting section 30 that forms a predetermined breaking point. The parting section is located in the bore 14 of the rivet body 11 and has a spacing from the flange 15 such that the breaking point on the mandrel shank 24 is located in the bore 14 even after setting of the blind rivet 10.

Figure 2:
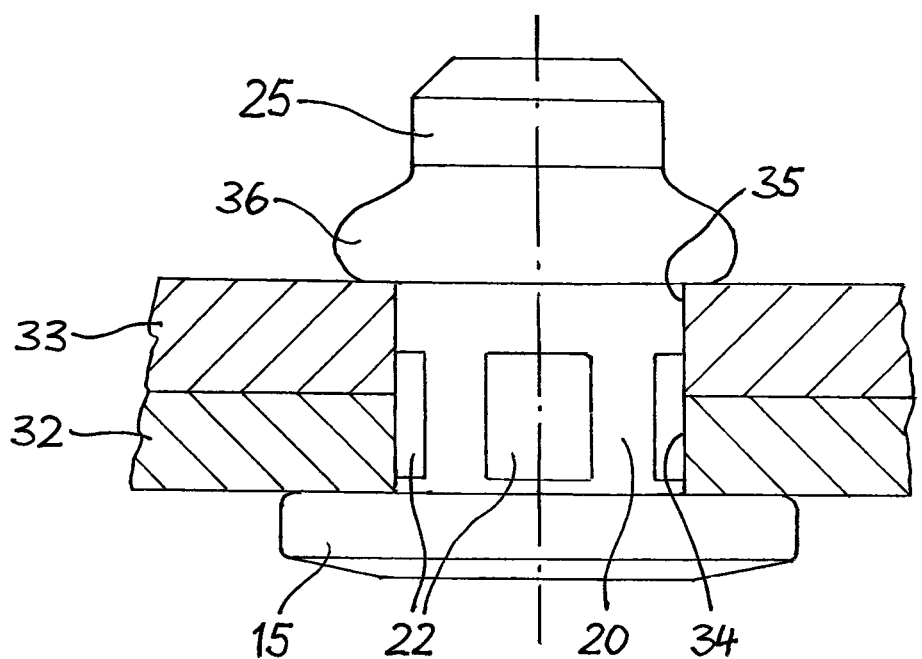
FIG. 2, a partial section of a fastening arrangement according to the invention.

FIG. 2 shows a fastening arrangement with two components 32, 33 joined by a blind rivet 10. The components 32, 33 have bores 34, 35. For the purpose of joining, the blind rivet 10 is inserted in the aligned bores 34, 35 of the components 32, 33. With the aid of a setting tool that bears on the support surface 16 of the blind rivet 10, a tensile force is then exerted on the drawing end 26 of the mandrel 12, and the rivet body is deformed, causing the foot end 17 to approach the flange 15. During this process, the barrel-like second section 21 on the blind side of the components 32, 33 folds to form a flange 36 that lies flat against the component 33 and presses the components 32, 33 against one another and against the flange 15. Consequently, the plastic components do not require any reinforcement by additional components made of metal, since the flange 36 rests virtually flat against the component 33. The component 33 experiences only a reduced radial load, because the flange 36 forms as a disk shape rather than as a cone shape. The cylindrical section 20 is located in the bores 34, 35 and is loaded in compression by the tensile force that is exerted. The increased strength of the section 20 that has been produced by the indentations 22 prevents or reduces a radial expansion in the section 20, however, so that no radial pressure, or at most a slight radial pressure, takes place between the section 20 and the walls of the bores 34, 35. As a result, the stress on the components 32, 33 in the radial direction is low, and the risk of overloading or damaging the components during setting of the blind rivet is avoided. Only in the blind-side end region of the bore 35 in the component 33 may a limited radial pressure resulting from radial expansion of the shank 13 be desirable in order to achieve a better seal between the blind rivet and component 33.

The invention claimed is:

1. A blind rivet assembly, the blind rivet assembly comprising a hollow rivet body including an elongated shank that extends coaxially to a longitudinal center axis of the blind rivet and has a bore, a flange extending radially at one end of the shank, and, at the opposite end of the shank, a foot end and located in the bore of the rivet body, a mandrel that has a mandrel shank, a drawing end projecting out of the flange of the rivet body that can be separated from the mandrel shank, and a mandrel head that stands in operative connection with a foot end of the rivet body in order to transmit a force to the rivet body during setting of the blind rivet, the shank of the rivet body has a first section adjoining the flange and, adjacent thereto and extending to the foot end, a second section, wherein the first section defines an original cylindrical shape, but with a plurality of spaced apart, longitudinally extending flat deformations of the original cylindrical shape separated by undeformed longitudinal portions substantially retaining corresponding portions of the original cylindrical shape, and wherein the strength of the first section of the shank is increased with respect to the strength of the second section by the spaced apart flat deformations as a result of plastic deformation via cold forming the flat deformations so that the outside diameter of the first section does not increase or increases only slightly during rivet setting, and wherein the flat deformations of the hardened section are depressions, wherein the second section of the shank has a barrel-like shape that curves outward, a mandrel head includes an annular and angled recessed contact surface engaging a blind end of the rivet body when set, and the mandrel head remaining secured to the rivet body after being set.

2. The blind rivet assembly according to claim 1, wherein the first section is plastically deformed to increase its strength.

3. The blind rivet assembly according to claim 1, wherein the first section has at least three of the deformations consisting of: radial indentations, compressions, or crimps, which extend over a majority of its length.

4. The blind rivet assembly according to claim 1, wherein the foot end of the shank has an increased strength as compared to the second section.

5. The blind rivet assembly according to claim 1, wherein the mandrel shank has, in the region of the foot end, at least one projection, and the foot end is brought by plastic deformation into a shape that engages around the projection.

6. The blind rivet assembly according to claim 1, wherein the mandrel shank and the drawing end are joined by a constricted parting section, which is located in the bore of the rivet body, and causes the remaining broken end of the set mandrel to be internally offset from the exposed flange of the rivet body.

7. The blind rivet assembly according to claim 1, wherein the rivet head has a contact surface for supporting the foot end that is inclined at an acute angle with respect to the longitudinal axis of the mandrel.

8. The blind rivet assembly according to claim 1, wherein the rivet body is aluminum, the mandrel is steel and the rivet body after rivet setting joining at least two plastic components that are plastic automotive parts.

9. The blind rivet assembly according to claim 1, further comprising first and second components, at least one being plastic that are joined after rivet setting, wherein the second component is located inaccessibly behind the first component, the two components have bores that are aligned with one another through which the blind rivet passes, wherein the flange of the blind rivet rests against the first component, the first section of the rivet's shank extends through the first component, and the second section of the shank forms the blind-side flange that lies substantially flat against the back of the second component, and wherein the outside diameter of the set first section is essentially equal to or smaller than the original inside diameter of the bore in the accessible, first component.

10. The blind rivet assembly according to claim 1, further comprising at least two components joined after rivet setting and at least one of the components being plastic, wherein the length of the first section of the shank is essentially equal to a sum of the thicknesses of the joined components in the region of the bores that the blind rivet passes through, or is smaller than the sum.

11. The blind rivet assembly according to claim 1, further comprising at least two components joined by the rivet after rivet setting, wherein the at least two components are both plastic.

12. A blind rivet assembly comprising:
(a) a plastic first part;
(b) at least a second part, each of the parts having a bore defined by a straight internal wall coaxially aligned with a centerline, completely from an accessible outer surface of the parts to a blind outer surface of the parts;
(c) a rivet body comprising a pre-formed tool-side flange, a hardened section adjacent the tool-side flange, and a barrel shaped section between the hardened section and a blind end of the rivet body, the hardened section including at least two longitudinally elongated cold-worked deformations;
the barrel shaped section laterally bulging beyond a largest internal diameter of the bores to longitudinally compress the parts between it and the tool-side flange when in a set condition; and
the hardened section defining an original cylindrical shape, but with a plurality of spaced apart, longitudinally extending flat deformations of the original cylindrical shape separated by undeformed longitudinal portions substantially retaining corresponding portions of the original cylindrical shape, and wherein the strength of the first section of the shank is increased with respect to the strength of the second section by the spaced apart flat deformations as a result of plastic deformation via cold forming the flat deformations so that the outside diameter of the first section does not increase or increases only slightly during rivet setting; and wherein the flat deformations of the hardened section are depressions.

13. The blind rivet assembly according to claim 12, further comprising a mandrel comprising a longitudinally elongated stem and a laterally enlarged head, the stem including at least one annular formation which is internally located within the rivet body both before and after rivet setting.

14. The blind rivet assembly according to claim 13, wherein the at least one annular formation includes an annular constricted neck which breaks during setting and at least two annular ribs which hold the remaining set mandrel to the rivet body.

15. The blind rivet assembly according to claim 12, wherein each of the deformations of the hardened section have a substantially rectangular peripheral shape with the elongated side edges being substantially parallel to the centerline and to all of the internal walls defining the bores in the parts.

16. The blind rivet assembly according to claim 12, wherein the deformations of the hardened section are spaced apart from each other and constitute at least a majority of the longitudinal distance within the bores of the parts.

17. The blind rivet assembly according to claim 12, wherein the deformations of the hardened section constitute less than all of the longitudinal distance within the bores of the parts.

18. The blind rivet assembly according to claim 12, wherein a backside of the tool-side flange is angled away from the adjacent part closest to the centerline and a laterally enlarged foot is adjacent the blind end of the rivet body, at least prior to rivet setting.

19. The blind rivet assembly according to claim 12, wherein all of the parts are plastic automotive components.

20. The blind rivet assembly according to claim 12, wherein the first part is an automotive door part.

21. A blind rivet assembly comprising:
(a) a rivet body comprising a pre-formed tool-side flange, a hardened section adjacent the tool-side flange, and a barrel shaped section between the hardened section and a blind end of the rivet body, the hardened section including at least two longitudinally elongated cold-worked deformations; and
(b) a mandrel comprising a longitudinally elongated stem and a laterally enlarged head, the stem including at least one annular formation which is internally located within the rivet body both before and after rivet setting;
wherein the first section defines an original cylindrical shape, but with a plurality of spaced apart, longitudinally extending flat deformations of the original cylindrical shape separated by undeformed longitudinal portions substantially retaining corresponding portions of the original cylindrical shape; and
wherein the strength of the first section of the shank is increased with respect to the strength of the second section by the spaced apart flat deformations as a result of plastic deformation via cold forming the flat deformations so that the outside diameter of the first section does not increase or increases only slightly during rivet setting; and
wherein the flat deformations of the hardened section are depressions.

22. The blind rivet assembly according to claim 21, wherein the at least one annular formation includes an annular constricted neck which breaks during setting and at least two annular ribs which hold the remaining set mandrel to the rivet body.

23. The blind rivet assembly according to claim 21, further comprising parts having bores through which the rivet body extends, wherein each of the deformations of the hardened section have a substantially rectangular peripheral shape with the elongated side edges being substantially parallel to the centerline and to internal walls defining the bores in the parts.

24. The blind rivet assembly according to claim 21, further comprising parts having bores through which the rivet body extends, wherein the deformations of the hardened section are spaced apart from each other and constitute at least a majority of an entire longitudinal distance of the bores of the parts.

25. The blind rivet assembly according to claim 21, further comprising parts having bores through which the rivet body extends, wherein the deformations of the hardened section constitute less than an entire longitudinal distance of the bores of the parts.

26. The blind rivet assembly according to claim 21, further comprising parts having bores through which the rivet body extends, wherein a backside of the tool-side flange is angled away from an adjacent one of the parts closest to the centerline and a laterally enlarged foot is adjacent the blind end of the rivet body, at least prior to rivet setting.

27. The blind rivet assembly according to claim 21, further comprising parts having bores through which the rivet body extends, wherein all of the parts are plastic automotive components.

28. The blind rivet assembly according to claim 21, further comprising parts having bores through which the rivet body extends, wherein at least one of the parts is an automotive door part.

29. A blind rivet assembly comprising:
(a) a plastic first part;
(b) at least a second plastic part, each of the parts having a bore defined by a straight internal wall coaxially aligned with a centerline, from an accessible outer surface of the parts to a blind outer surface of the parts;
(c) a rivet body comprising:
tool-side flange;
a hardened section adjacent the tool-side flange;
a barrel shaped section between the hardened section and a blind end of the rivet body;
the hardened section defining an original cylindrical shape, but with at least two longitudinally elongated cold-worked flat deformations of the original cylindrical shape, the flat deformations being separated by undeformed longitudinal portions substantially retaining corresponding portions of the original cylindrical shape, the hardened section has a strength that is increased with respect to a strength of the second section by the spaced apart flat deformations as a result of plastic deformation via cold forming the flat deformations to resist lateral expansion so that an outside diameter of the first section does not increase or increases only slightly during rivet setting, each of the flat deformations of the hardened section having a substantially rectangular peripheral shape with the elongated side edges being substantially parallel to the centerline, and the deformations of the hardened section being spaced apart from each other, wherein the flat deformations of the hardened section are depressions;

the barrel shaped section laterally bulging beyond a largest internal diameter of the bores to longitudinally compress the parts between it and the tool-side flange when in a set condition;
(d) a mandrel comprising:
a longitudinally elongated stem including at least one annular formation which is internally located within the rivet body both before and after rivet setting;
a laterally enlarged head;
the at least one annular formation including an annular constricted neck which breaks during setting; and
at least two annular ribs which hold the remaining set mandrel to the rivet body.

30. The blind rivet assembly according to claim 29, wherein the deformations of the hardened section constitute less than all of the longitudinal distance within the bores of the parts.

31. The blind rivet assembly according to claim 29, wherein the first part is an automotive door part.

\* \* \* \* \*